June 19, 1956     W. H. BOLDINGH ET AL     2,751,504
SUPPORT FOR IMAGE AMPLIFIERS
Filed May 1, 1952
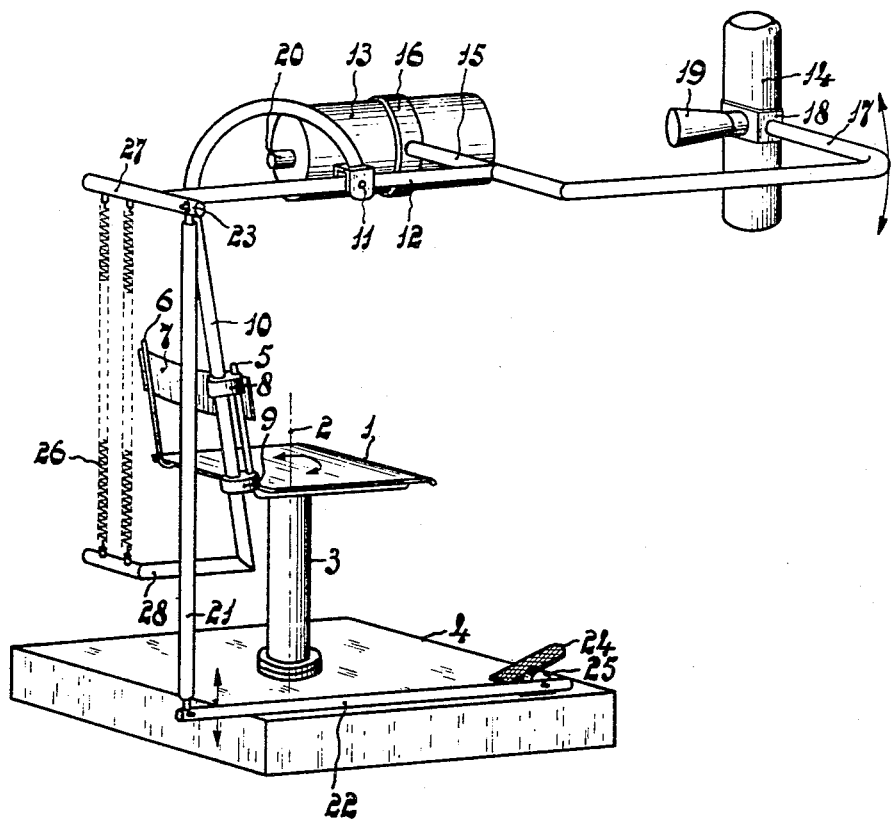
INVENTORS
Adrianus Verhoeff
Wybe Johannes Oosterkamp
Willem Hondius Boldingh
Jan Jesayas Christiaan Hardenberg
BY
AGENT

United States Patent Office 2,751,504
Patented June 19, 1956

2,751,504
SUPPORT FOR IMAGE AMPLIFIERS

Willem Hondius Boldingh, Jan Jesayas Christiaan Hardenberg, Wybe Johannes Oosterkamp, and Adrianus Verhoeff, Eindhoven, Netherlands, assignors to Hartford National Bank and Trust Company, Hartford, Conn., as trustee Application May 1, 1952, Serial No. 285,498

Claims priority, application Netherlands June 14, 1951

6 Claims. (Cl. 250—79)

When a medical examination by X-rays is effected by means of a fluoroscopic device the patient should not be exposed to more rays than is strictly necessary. This causes the degree of brightness of the fluorescent image to be very low so that care must be taken that the amount of light different from the screen luminescence falling on the eye of the observer is a minimum. Because of the development of the image intensifier in a form suitable for examination by X-rays it is no longer necessary in all cases that this examination should be effected in the dark. The image intensifier is a ray collector in the form of a discharge tube in which the X-ray image is transferred by electron rays to a luminescent screen and is transformed into an image which has a higher degree of brightness and can be viewed without the eye sensitivity being increased by previous conditioning in darkened surroundings. The degree of brightness sufficient for this purpose can be obtained even with a tube load which is lower than when using a fluoroscopic screen.

The use of an image intensifier presents an important advantage in this respect but has a limitation in the comparatively small, generally circular screen in the image amplifier (the size of about 12 cms.) on which the image formed by the X-rays is intercepted. This is due to the admissible length of the tube, because at the present state of development of electron-optical projection the electron-optical reproducing system by means of which reproduction is possible without excessive faults, has a limited aperture. The length of the image intensifier should not be excessive, because it should be possible for the examiner to manoeuvre with respect to the patient so as to place him in a position favourable for examination.

If in direct fluoroscopy the zone required to be examined is not covered entirely by the screen, the screen and, if required, the X-ray tube are moved in different directions at right angles to the central way of the beam produced by the X-ray tube in order to scan the said zone. In this case there is generally no need to move the head but it is sufficient to follow the movement of the screen with the eyes. The use of an image intensifier requires the head of the examiner to perform the same movements in order that it may be possible to continue to view the small screen, since the position of the eye is bound by the aperture of the image amplifier. It is very tiring to perform these movements, which may be displacements of about 30 cms., particularly when vertical displacement is followed. In addition, when viewing the image screen of the image intensifier through an optical magnifying device so as to improve judgment of the image formed, it becomes very difficult to keep the eye in the correct position in front of the aperture of the optical instrument.

The invention relates to a support for supporting the X-ray tube and the ray-collector, constituted by an image intensifier together with an optical instrument for viewing the image screen said support being arranged so as to enable a large zone to be covered without particular exertion being required on the part of the examiner.

According to the invention a support for an X-ray tube and a ray-collector constituted by an image intensifier together with an optical instrument for viewing the image screen is characterized in that the X-ray tube and the ray collector are rigidly united by a carrier which is adapted to be rotated about a horizontal axis located on the side of the ray collector remote from the X-ray tube at a distance such that the displacement of the aperture of the optical instrument resulting from the rotation of the tube about said axis can be followed by the eye of the observer merely by slightly bending the upper part of his body.

The glancing direction of the eye may be changed through a small angle without moving the head, for example when the axis of rotation intersects the central ray at a point to be occupied by the eye of the observer, and hence in general immediately in front of the lens which constitutes the aperture of the optical instrument. If the movements of the central ray are larger than those which can thus be easily followed it is desirable that the axis of rotation should be directed towards the point at which the atlas, that is to say the pivot on which the head of the examiner moves, is located. This point is at a level lower by about 15 cms. than the aperture at which the eye of the observer is positioned when viewing the image and is in a horizontal sense at a distance of about 15 cms. therefrom. Finally, the axis of rotation may be directed so that, particularly in the case of large divergences, a small movement of the upper part of the body is required. The vertical displacement of the aperture should be prevented from exceeding the natural displacement of the eye in this direction when following the central ray.

Following the horizontal displacement of the central ray of the X-ray beam when scanning the zone required to be fluoroscopied is less tiring than following its movement in a vertical sense, but nevertheless it is preferable to construct the support according to the invention so as to limit to a minimum the movements of the body required for this purpose. According to a further aspect of the invention the carrier for the X-ray tube and the ray-collector is adapted to rotate about a vertical axis in a plane comprising the central ray, the axis intersecting the horizontal axis of rotation. One embodiment of a support according to the invention will now be described in detail with reference to the accompanying drawing.

The device is supported on a chair, the seat 1 of which is adapted to rotate about a vertical axis 2 and is secured to a column 3 which bears on a base 4. Secured to the seat by means of two members 5 and 6 is its back 7. The support is secured to one of the members 5 and when the seat 1 is rotated it follows this movement. For attachment, use is made of two clips 8 and 9 which embrace the column 10 and unite it rigidly with the member 5. The top of the column has a bent-over part and at the end thereof a pivot 11 which is constructed as a ball-bearing to support the carrier 12. The form of the column is chosen to be comparatively arbitrary, but care should be taken that the horizontal axis which comprises the pivot 11 occupies the position which is most favourable for the control of the device. In the figure the pivot is chosen so that the axis of rotation is directed through the eye by means of which the person seated on the chair performs the examination.

The examination is effected using an X-ray image intensifier 13 which jointly with an X-ray tube 14 is rigidly connected to the carrier 12. For this purpose the latter is provided with a lever 15 which carries a clamping band 16 in which the image intensifier 13 is secured in position. A second lever 17, which is also provided with a clamping band 18 has the X-ray tube 14 secured to it. The patient to be examined is placed between the image intensifier 13 and the ray cone 19 arranged in front of the ray exit aperture of the X-ray tube. The image intensifier 13 is provided with an optical viewing device 20 which is at a level with the eye of the observer.

When the examination is being performed the X-ray tube is swung about the horizontal axis. Due to the axis of rotation being arranged so as to pass through the point 11 the image intensifier also performs a swinging movement through the same angle, but the displacement of the aperture 20 can be readily followed by the eye of the observer, who in this case need only slightly turn the head upwards or downwards. In order that the movement of the tube may be performed, the carrier 12 is extended beyond the pivot 11 and provided at its end with a rod 21 which is pivoted to a second rod 22. The joint 23 of the carrier is also constructed in the form of a pivot.

The rod 22 has rigidly connected to it a treadle 24 which is adapted to rotate in a bearing 25 arranged on the base 4. On the treadle being bent forward the other end of the rod 22 is lifted and this movement is transmitted to the carrier 12. This results in the X-ray tube 14 being moved downwardly so that the central ray is upwardly inclined. A backward movement of the treadle 24 causes the tube 14 to rise. These movements are enabled by the weight of the various parts secured to the carrier being counter-balanced by springs. These springs 26 connect the traverse member 27 at the end of the carrier 12 to a fixed arm 28 of the column 10. As an alternative counter-balancing may be effected by weights secured to the carrier 12 or to the rod 22.

The support being secured to the back of the rotary chair it also follows the rotary movement about the vertical axis 2. The two movements enable a considerably large surface area to be scanned.

What we claim is:

1. A support for an X-ray tube, image intensifier and an optical viewing device comprising a carrier being provided with at least two clamping arms, one of said clamping arms embracing said image intensifier and optical viewing device and the other of said clamping arms embracing said X-ray tube in a fixed, spaced relationship with said image intensifier and said optical viewing device, a standard, and means pivoting said carrier on said standard at a point adjacent the end of said image intensifier remote from said X-ray tube, said carrier being adapted to be rotated about the horizontal axis of said pivoting means the horizontal axis of said pivoting means extending in a direction perpendicular to said carrier, and the displacement of said optical viewing device being such that the rotation of said carrier may be followed in said optical viewing device by the observer by bending only the upper part of his body.

2. A support as set forth in claim 1 further comprising means pivoting said standard and carrier about a vertical axis which intersects said horizontal axis of rotation.

3. A support for an X-ray tube, image intensifier and an optical viewing device comprising a carrier being provided with at least two clamping arms, one of said clamping arms embracing said image intensifier and optical viewing device and the other of said clamping arms embracing said X-ray tube in a fixed, spaced relationship with said image intensifier and said optical viewing device, a standard, and means pivoting said carrier on said standard at a point adjacent to the end of said image intensifier remote from said X-ray tube, said carrier being rotated about the horizontal axis of said pivoting means, and the displacement of said optical viewing device being such that the rotation of said carrier may be followed in said optical viewing device by the observer bending only the upper part of his body, the horizontal axis of rotation of said carrier intersecting the rays of said X-ray tube at a point in the plane of the eye of the observer.

4. A support for an X-ray tube, image intensifier and an optical viewing device comprising a carrier being provided with at least two clamping arms, one of said clamping arms embracing said image intensifier and optical viewing device and the other of said clamping arms embracing said X-ray tube in a fixed, spaced relationship with said image intensifier and said optical viewing device, a standard, means pivoting said carrier on said standard at a point adjacent the end of said image intensifier remote from said X-ray tube, said carrier being adapted to be rotated about the horizontal axis of said pivoting means and the displacement of said optical viewing device being such that the rotation of said carrier may be followed in said optical viewing device by the observer by bending only the upper part of his body, a base member, a chair rotatably mounted on said base member about a vertical axis intersecting said horizontal axis of rotation, and means rigidly securing said standard to said chair.

5. A support as set forth in claim 4 further comprising resilient means connected at one end to said carrier and at the other end to said standard, a treadle, a pivoting rod arrangement connected at one end to said carrier and at the other end to said treadle whereby when said treadle is activated said carrier is rotated about said horizontal axis of said pivoting means.

6. A support as set forth in claim 4 wherein the one end of said rod arrangement connected to the carrier is connected thereto at a point more remote from said X-ray tube than said pivoting means.

References Cited in the file of this patent

UNITED STATES PATENTS

| | | |
|---|---|---|
| 1,933,325 | Goldfield et al. | Oct. 31, 1933 |
| 2,103,693 | Pohl | Dec. 23, 1937 |
| 2,319,712 | Williams | May 18, 1943 |
| 2,523,132 | Mason et al. | Sept. 19, 1950 |
| 2,546,699 | Poittevin | Mar. 27, 1951 |
| 2,555,545 | Hunter et al. | June 5, 1951 |

FOREIGN PATENTS

| | | |
|---|---|---|
| 137,810 | Germany | Jan. 20, 1903 |
| 732,374 | France | Sept. 19, 1932 |